US011066988B2

(12) United States Patent
Melde-Tuczai et al.

(10) Patent No.: US 11,066,988 B2
(45) Date of Patent: Jul. 20, 2021

(54) LENGTH-ADJUSTABLE CONNECTING ROD WITH CONTROL DEVICE

(71) Applicants: AVL LIST GMBH, Graz (AT); IWIS MOTORSYSTEME GMBH & CO. KG, Munich (DE)

(72) Inventors: Helmut Melde-Tuczai, Graz (AT); Abdelkarim Redouane, Graz (AT); Siegfried Hartwig, Graz (AT)

(73) Assignees: AVL List GmbH, Graz (AT); iwis motorsysteme GmbH & Co. KG, Munich (DE)

( * ) Notice: Subject to any disclaimer, the term of this patent is extended or adjusted under 35 U.S.C. 154(b) by 69 days.

(21) Appl. No.: 16/338,382

(22) PCT Filed: Sep. 29, 2017

(86) PCT No.: PCT/EP2017/074836
§ 371 (c)(1),
(2) Date: Dec. 30, 2019

(87) PCT Pub. No.: WO2018/060457
PCT Pub. Date: Apr. 5, 2018

(65) Prior Publication Data
US 2020/0131985 A1    Apr. 30, 2020

(30) Foreign Application Priority Data

Sep. 30, 2016    (AT) .............................. A 50888/2016

(51) Int. Cl.
*F02B 75/04*    (2006.01)
*F02D 15/02*    (2006.01)
(Continued)

(52) U.S. Cl.
CPC ............ *F02B 75/045* (2013.01); *F02D 15/02* (2013.01); *F15B 15/12* (2013.01); *F15B 21/041* (2013.01);
(Continued)

(58) Field of Classification Search
CPC .... F02B 75/045; F02D 15/02; F16K 31/1225; F16K 31/1226; F01B 31/14; F16C 7/04; F16C 7/06; F15B 15/12; F15B 21/041
See application file for complete search history.

(56) References Cited

U.S. PATENT DOCUMENTS 4,736,715 A    4/1988    Larsen
9,605,590 B2 *    3/2017    Yamada ................ F02B 75/047
(Continued)

FOREIGN PATENT DOCUMENTS

| AT | 518848 | 10/2018 |
|---|---|---|
| CN | 101016863 | 8/2007 |

(Continued)

OTHER PUBLICATIONS

Translation of the International Preliminary Report on Patentability for International (PCT) Patent Application No. PCT/EP2017/074836, dated Apr. 11, 2019, 10 pages.
(Continued)

*Primary Examiner* — Syed O Hasan
(74) *Attorney, Agent, or Firm* — Sheridan Ross PC

(57) ABSTRACT

A length-adjustable connecting rod for a reciprocating piston machine, which may be a reciprocating piston internal combustion engine, is disclosed as well as a reciprocating piston machine and a vehicle. The connecting rod comprises a hydraulic length-adjusting device for adjusting an effective connecting rod length and a control device that can switch between two switching states, for controlling the length-adjusting device. The length-adjusting device comprises a
(Continued)

Figure 1:
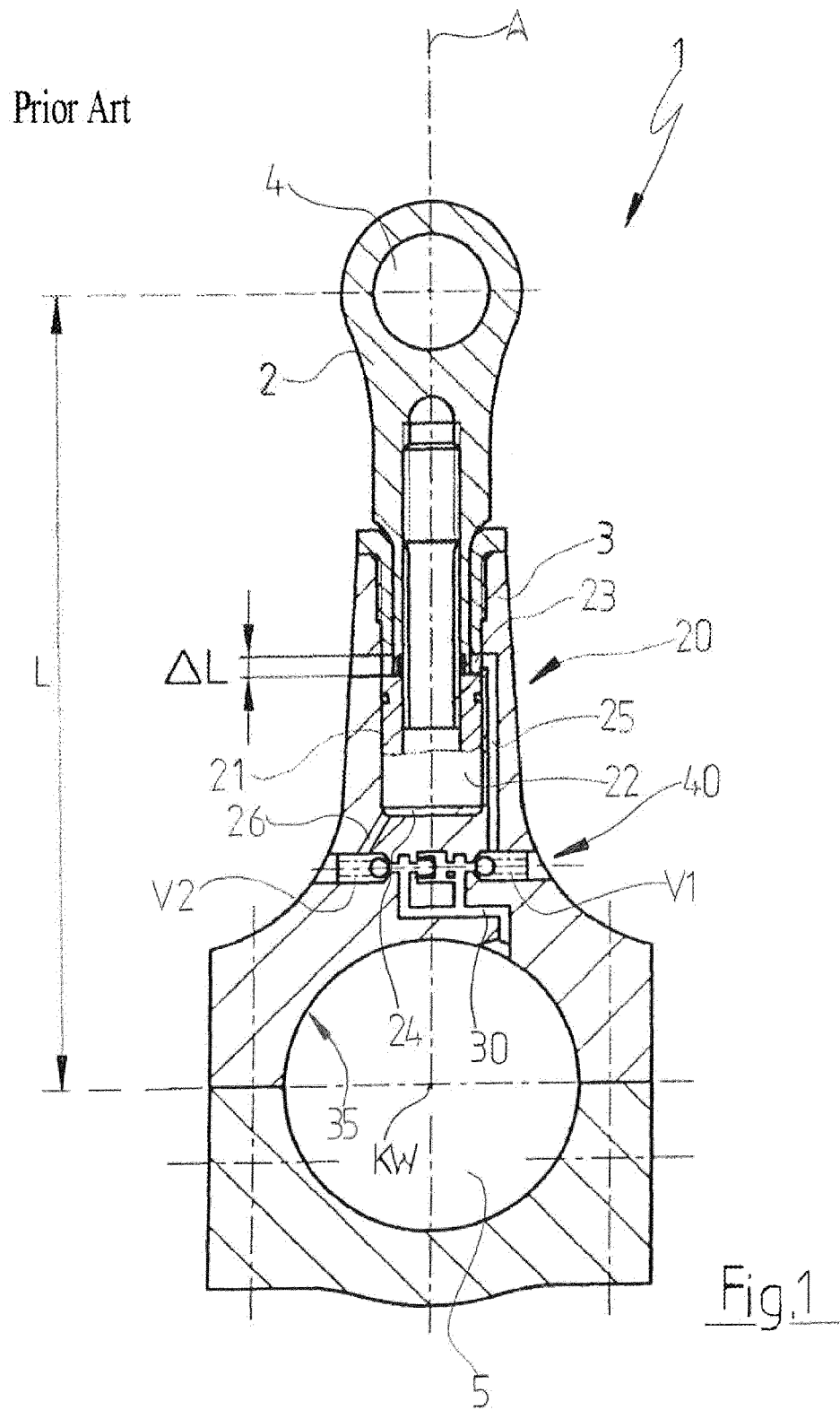

hydraulic cylinder with a piston and a first hydraulic working chamber and a second hydraulic working chamber, the control device comprising a first valve and a second valve, the first valve of the control device being connected to the first hydraulic working chamber of the length-adjusting device in a fluid-communicating manner, and the second valve to the second hydraulic working chamber, the first valve and the second valve each being actuatable by means of a hydraulically actuatable adjusting piston that can axially move along an adjusting axis, the adjusting axis of the first valve being different from the adjusting axis of the second valve.

18 Claims, 9 Drawing Sheets

(51) Int. Cl.
| | |
|---|---|
| *F16K 31/122* | (2006.01) |
| *F16C 7/04* | (2006.01) |
| *F15B 15/12* | (2006.01) |
| *F16C 7/06* | (2006.01) |
| *F15B 21/041* | (2019.01) |
| *F01B 31/14* | (2006.01) |

(52) U.S. Cl.
CPC ................. *F16C 7/04* (2013.01); *F16C 7/06* (2013.01); *F16K 31/1225* (2013.01); *F16K 31/1226* (2013.01); *F01B 31/14* (2013.01)

(56) References Cited

U.S. PATENT DOCUMENTS

2017/0204784 A1* 7/2017 O'Shea ................. F02B 75/045
2018/0202469 A1* 7/2018 Huber ................... F15B 13/027

FOREIGN PATENT DOCUMENTS

| DE | 102012020999 | 1/2014 |
|---|---|---|
| DE | 102015122451 | 6/2016 |
| DE | 102015203387 | 8/2016 |
| EP | 2052952 | 4/2009 |
| JP | S58-165543 | 9/1983 |
| JP | 2008-025431 | 2/2008 |
| WO | WO 2010/108582 | 9/2010 |
| WO | WO 2015/055582 | 4/2015 |
| WO | WO 2015/108178 | 7/2015 |
| WO | WO 2015/108182 | 7/2015 |
| WO | WO 2016/203047 | 12/2016 |
| WO | WO 2017/102108 | 6/2017 |

OTHER PUBLICATIONS

Official Action for Austria Patent Application No. 50888/2016, dated Aug. 10, 2017, 5 pages.
International Search Report prepared by the European Patent Office dated Nov. 9, 2017, for International Application No. PCT/EP2017/074836.
Official Action with English Translation for China Patent Application No. 201780073329.2, dated Oct. 12, 2020, 21 pages.

* cited by examiner

LENGTH-ADJUSTABLE CONNECTING ROD WITH CONTROL DEVICE

CROSS REFERENCE TO RELATED APPLICATIONS

This application is a national stage application under 35 U.S.C. 371 and claims the benefit of PCT Application No. PCT/EP2017/074836 having an international filing date of 29 Sep. 2017, which designated the United States, which PCT application claimed the benefit of Austria Patent Application No. A 50888/2016 filed 30 Sep. 2016, the disclosure of each of which are incorporated herein by reference.

The present invention relates to a length-adjustable connecting rod for a reciprocating piston engine, in particular for a reciprocating piston internal combustion engine, wherein the connecting rod comprises a hydraulic length-adjusting apparatus for adjusting an effective connecting rod length of the connecting rod and a control device able to switch between at least two switching states for controlling the lengthwise adjustment of the connecting rod, wherein the length-adjusting apparatus comprises at least one hydraulic cylinder with a piston, a first hydraulic working chamber and second hydraulic working chamber, wherein the control device comprises at least one first valve and second valve, wherein the first valve of the control device is connected or connectable to the first hydraulic working chamber of the length-adjusting apparatus in a fluid-communicating manner and the second valve to the second hydraulic working chamber, and wherein the first valve can be actuated by means of a first hydraulically actuatable adjusting piston able to move axially along a first adjusting axis and the second valve is actuatable by means of a second hydraulically actuatable adjusting piston able to move axially along a second adjusting axis.

The present invention further relates to a reciprocating piston engine, particularly a reciprocating piston internal combustion engine, having at least one length-adjustable connecting rod as well as a vehicle with a reciprocating piston engine, in particular a reciprocating piston internal combustion engine.

In the sense of the invention, a connecting rod refers to the rod-like connecting element in a reciprocating piston engine which connects the crankshaft of the reciprocating piston engine to a reciprocating piston. The connecting rod thereby serves to convert a linear motion of the reciprocating piston, in particular a linearly oscillating axial motion of the reciprocating piston, which usually relates to a power or working piston, into a circular movement of the crankshaft or, conversely, a circular motion of the crankshaft into a linear movement of the reciprocating piston.

A crankshaft in the sense of the invention refers to a shaft which in a reciprocating piston engine is designed to convert the linearly oscillating motion, in particular the translational motion, of one or more reciprocating pistons into a rotational movement by means of connecting rods or, conversely, the rotational motion of the crankshaft into a translational movement.

To connect to the reciprocating piston and the crankshaft, the connecting rod normally exhibits a connecting rod bearing at both its respective ends, usually in the form of a connecting rod eye, whereby the connecting rod usually has a smaller connecting rod eye on the piston-side end and a larger connecting rod eye on the crankshaft-side end in terms of the functional installed state of a connecting rod in a reciprocating piston engine. A reciprocating piston can then be connected at the piston-side end of the connecting rod via a piston pin seated in the small connecting rod eye. The connecting rod can be connected to the crankshaft via the larger connecting rod eye, wherein a connecting rod bearing designed as a sliding bearing lubricated with hydraulic medium, particularly with the engine oil of a reciprocating piston engine, is usually disposed in the large connecting rod eye.

The connecting rod is thereby in each case rotatably mounted around a rotational axis about the crankshaft and the piston pin, wherein the distance between the two axes of rotation define an operative or respectively effective connecting rod length. Changing the effective connecting rod length, in particular by adjusting the effective connecting rod length, can change the compression ratio in a reciprocating piston engine since the change in effective connecting rod length effects a shift in the top dead center of the piston stroke.

Length-adjustable connecting rods are used in particular in reciprocating piston engines of variable compression ratio in order to regulate the compression ratio.

Changing the compression ratio by changing the effective connecting rod length is generally known from the prior art, e.g. DE 10 2012 020 999 A1 or WO 2015/055582 A2.

The length-adjustable connecting rod described in DE 10 2012 020 999 A1 exhibits an eccentric arranged in the small connecting rod eye, whereby two hydraulic cylinders for adjusting the eccentric are provided at least partly external of the connecting rod shaft and are supplied hydraulic medium from the engine oil of the reciprocating piston engine. For controlling the two hydraulic cylinders, and thus for the adjusting the length of the connecting rod, a control device having two valves is provided which can supply the two respective hydraulic cylinders with hydraulic medium so as to set the desired change in the connecting rod length.

A length-adjustable connecting rod having a hydraulic length-adjusting apparatus is known from WO 2015/055582 A2, wherein the connecting rod is divided into a first connecting rod shaft section and a second connecting rod shaft section, wherein the two connecting rod shaft sections are displaceable along a longitudinal axis of the connecting rod relative to one another, in particular telescopically displaceable into or apart from one another, and wherein one of the two connecting rod shaft sections forms a hydraulic cylinder and the other connecting rod shaft section an associated hydraulic piston. A hydraulically actuatable control device having a single-acting actuator piston which is axially displaceable in a longitudinal center plane of the connecting rod perpendicular to the crankshaft axis is provided as an adjusting element for controlling the length-adjusting apparatus. In functional usage of the connecting rod in a reciprocating piston engine, the adjusting piston is axially displaceable from a first set position into a second set position against a restoring force generated by a spring via the acting engine oil pressure in an associated reciprocating engine, whereby one or more hydraulic inflows/outflows of the hydraulic length-adjusting apparatus are enabled or blocked depending on the set position of the adjusting piston. The degree of engine oil pressure which will effect a displacement of the adjusting piston from the first set position into the second set position can be regulated by means of the spring constant of the return spring.

Given this background, it is a task of the invention to provide an alternative length-adjustable connecting rod for a reciprocating piston engine, in particular an improved length-adjustable connecting rod. Preferably to be enabled is a more flexible arrangement of the control device in the connecting rod. Moreover a task of the invention is providing an alternative reciprocating piston engine, in particular an improved reciprocating piston engine, as well as an alternative vehicle, in particular an improved vehicle, having a reciprocating piston engine.

The invention solves these tasks by the teachings of the independent claims. Preferential further developments of the invention constitute the subject matter of the subclaims and will be described in greater detail in the following. The wording of the claims is hereby incorporated into the content of the description.

A connecting rod according to the invention is characterized in that the first adjusting axis of the first valve of the control device is different from the second adjusting axis of the second valve of the control device.

By the inventive arrangement of the first valve and the second valve of the control device in the connecting rod, in particular by the first adjusting axis of the first valve and the second adjusting axis of the second valve being different from each other, or not coinciding respectively, a particularly short structural length to the control device can be achieved. As a result, there is greater flexibility in arranging the control device and the control device can be arranged in the connecting rod in a number of ways pursuant to the respective requirements. The possible arrangements of the inventive control device in the connecting rod are thereby thus only subject to minimal restrictions.

In particular, a connecting rod according to the invention with a control device, in which the first adjusting axis of the first valve and the second adjusting axis of the second valve inventively differ from one another, enables virtually any arrangement of the first valve and the second valve in the connecting rod. The first valve and the second valve can thereby be respectively in orthogonal, parallel or oblique arrangement to a longitudinal axis of the connecting rod and/or in orthogonal, parallel or oblique arrangement to a crankshaft axis, with respect to a functional installed state of the connecting rod in a reciprocating piston engine, in particular a reciprocating piston internal combustion engine.

To connect to a reciprocating piston of a reciprocating piston engine, in particular a reciprocating piston internal combustion engine, a connecting rod according to the invention preferably exhibits a small connecting rod eye on its piston-side connecting rod end or, alternatively, a piston pin fixedly connected to the connecting rod, whereby in the first case; i.e., when the connecting rod has a small connecting rod eye, the connecting rod can be connected to a reciprocating piston of a reciprocating piston engine by means of a piston pin in a manner sufficiently known from the prior art. In the second case, the reciprocating piston to be connected to the connecting rod preferably has a corresponding eye in which the piston pin fixedly connected to the connecting rod can be received, in particular supported, and the reciprocating piston can be accordingly connected to the connecting rod via the piston pin. As is common in the prior art, a large connecting rod eye is preferably provided on the crankshaft-side end for connecting the connecting rod to a crankshaft.

In one advantageous invention configuration of an inventive connecting rod, the first adjusting axis of the first valve of the control device and/or the second adjusting axis of the second valve of the control device run parallel to the crankshaft axis, whereby preferably both the first adjusting axis and the second adjusting axis each run parallel to the crankshaft, in each case with regard to a functionally installed state of the connecting rod in a reciprocating piston engine, in particular in a reciprocating piston internal combustion engine.

The arrangement of the first valve of the control device and/or the second valve of the control device with the respectively associated adjusting axis parallel to the crankshaft axis enables a simple way to effectively decouple the first valve and/or the second valve of the control device from a large percentage of the centrifugal forces acting on the control device during a working stroke. In particular, such an arrangement can prevent the first adjusting piston and/or the second adjusting piston from axially displacing along the respective adjusting axis from the given centrifugal forces and the first valve and/or the second valve opening and/or closing unintentionally and/or at an undesirable time.

In an inventive connecting rod, the parallel arranged adjusting axes of the two valves can be situated in different common planes, particularly in a horizontal plane, a vertical plane or in an oblique plane, whereby the first adjusting axis and the second adjusting axis are preferably arranged side by side in a horizontal plane and preferably arranged one above the other in a vertical plane. If the two adjusting axes lie in an oblique plane, they are preferably arranged at a horizontal and/or vertical offset from one another. It can be advantageous in some cases for the first adjusting axis and/or the second adjusting axis to lie in a common plane with the crankshaft axis.

The length-adjusting apparatus of a connecting rod according to the invention can in principle be designed in a host of different ways, examples being the length-adjusting apparatus as described in WO 2015/055582 A2, WO 2016/203047 A1, WO 2017/102108 A1 or Austrian patent application A50757/2016, whereby reference is made to the aforementioned documents for further details regarding the possible designs as well as the operating principles of length-adjusting apparatus applicable to a connecting rod according to the invention.

In a further advantageous configuration of a connecting rod according to the invention, the inventive connecting rod comprises a first connecting rod shaft section and a second connecting rod shaft section, whereby the two connecting rod shaft sections are preferably displaceable relative to each other, in particular along the longitudinal axis of the connecting rod, for adjusting an effective connecting rod length.

As defined by the invention, a connecting rod shaft is thereby to be understood as the rod-like section between the piston-side end of the connecting rod and the crankshaft-side end of the connecting rod.

In a further advantageous configuration of an inventive connecting rod, the two connecting rod shaft sections are slidable into each other telescopically, preferably along the longitudinal axis of the connecting rod, for adjusting the effective connecting rod length, whereby in particular one of the two connecting rod shaft sections form the hydraulic cylinder of the length-adjusting apparatus and the piston of the length-adjusting apparatus is fixed to the other connecting rod shaft section.

The piston of the length-adjusting apparatus is preferably designed as a double-acting piston and divides in particular the hydraulic cylinder of the length-adjusting apparatus into the first hydraulic working chamber and the second hydraulic working chamber.

The hydraulic cylinder of the length-adjusting apparatus therefore does not need to be a cylinder in the mathematical sense. A hydraulic cylinder in the sense of the invention can also exhibit a cross section which deviates from a circular shape over its axial length. Important is only that the hydraulic cylinder and the piston of the length-adjusting apparatus are configured, in particular correspond to one another, such that the functionality needed for the lengthwise adjustment can be achieved, in particular the tightness required for a sufficient buildup of pressure, if need be with the help of sealants, as well as sufficient guidance of the piston in the hydraulic cylinder during lengthwise adjustment.

Preferably, the hydraulic cylinder of the length-adjusting apparatus is thereby situated completely within the connecting rod, in particular within the connecting rod shaft.

The hydraulic feed required for the length-adjusting apparatus preferably ensues via a hydraulic medium feed line, whereby the hydraulic medium feed line can in particular be supplied with hydraulic medium via the crankshaft-side connecting rod bearing.

In a further advantageous configuration of an inventive connecting rod, a hydraulic medium return flow from the first hydraulic working chamber of the length-adjusting apparatus is blocked and the second working chamber is drained in a first switching state of the control device and preferably the first hydraulic working chamber of the length-adjusting apparatus is drained and the hydraulic medium return flow from the second hydraulic working chamber of the length-adjusting apparatus is blocked in a second switching state of the control device.

The first valve and the second valve of the control device are thereby preferably of inverse design, in particular inversely operative, in particular such that one of the two valves of the control device in each case opens or remains open and the other valve closes and/or remains closed in the first switching state as well as in the second switching state of the control device.

In a further advantageous configuration of an inventive connecting rod, the first adjusting piston of the first valve and/or the second adjusting piston of the second valve is/are designed as a single-acting adjusting piston, whereby the adjusting piston is preferably axially displaceable in at least one direction against an adjusting piston restoring force, and whereby the associated valve preferably comprises an adjusting piston resetting device for producing the adjusting piston restoring force, in particular an adjusting piston return spring. In other words, the adjusting piston of at least one valve is designed as a single-acting adjusting piston in one advantageous configuration of an inventive connecting rod.

Preferably both the first adjusting piston of the first valve as well as the second adjusting piston of the second valve are each designed as a single-acting adjusting piston. When an adjusting piston resetting device, in particular a return spring, is provided, same is preferably designed, in particular its spring constant selected, such that the associated valve closes and/or remains closed at a defined first hydraulic pressure level on the adjusting piston and opens and/or remains opened at a second defined hydraulic pressure level.

The first defined hydraulic pressure level thereby preferably corresponds to a first hydraulic medium pressure in a reciprocating piston engine, in particular a first engine oil pressure in a reciprocating piston internal combustion engine. The second defined hydraulic pressure level preferably corresponds to a second defined engine oil pressure of the reciprocating piston engine. Such a configuration of the control device enables utilizing the existing hydraulic medium pressure, in particular the given engine oil pressure, in the reciprocating engine to actuate the control device.

In a further, in particular alternative configuration of an inventive connecting rod, the first adjusting piston of the first valve and/or the second adjusting piston of the second valve is designed as a double-acting adjusting piston, wherein the connecting rod, in particular the control device, preferably additionally comprises a switching valve for the actuation of the control device, via which the adjusting piston can be subjected to a hydraulic medium pressure differential, in particular a control medium pressure differential. The switching valve is thereby in particular designed such that in a first switching state of the switching valve, a first hydraulic medium pressure differential is on the adjusting piston, which effects an axial displacement of the adjusting piston into a first set position, and in a second switching state of the switching valve, a second hydraulic medium pressure differential which effects an axial displacement of the adjusting piston into a second set position. In other words, the adjusting piston of at least one valve is designed as a double-acting adjusting piston in one advantageous configuration of a connecting rod according to the invention. Preferably (in an alternative configuration from the previously described configuration with two single-acting adjusting pistons), the first adjusting piston of the first valve and the second adjusting piston of the second valve are each designed as a double-acting adjusting piston.

It is however also theoretically conceivable for an adjusting piston of one valve to be designed as a single adjusting piston and the adjusting piston of the other valve as a double acting adjusting piston.

A control device designed as such with double-acting adjusting pistons has the advantage of being able to decouple the control of the length-adjusting apparatus from the given hydraulic pressure level, in particular decoupling from engine oil pressure in the reciprocating piston internal combustion engine, because the additional switching valve only needs one hydraulic medium pressure level to adjust the connecting rod length and thus in particular only one engine oil pressure level.

The switching valve further enables an actuating of the control device independently of the hydraulic medium pressure level of the reciprocating piston engine, in particular independently of a given engine oil pressure level in a reciprocating piston engine, and thus virtually independently of the reciprocating piston engine's operating state.

The switching valve is thereby preferably coupled to the first adjusting piston of the first valve and/or the second adjusting piston of the second valve in each case such that a first hydraulic medium pressure differential or control medium pressure differential respectively is applied on the respective adjusting piston by means of the switching valve in a first switching state of the switching valve and a second hydraulic medium pressure differential/control medium pressure differential in a second switching state of the switching valve.

Preferably, the additional switching valve is thereby designed as an electromagnetically actuatable hydraulic switching valve which is operatively connected, in particular hydraulically, to the control device and can be actuated or respectively switched electromagnetically. For further details on how such a switching valve and a connecting rod accommodating the switching valve can be designed, reference is hereto made to WO 2017/102108 A1 which describes such a switching valve as well as a connecting rod having such a switching valve.

Alternatively, the additional switching valve can also be designed as a mechanically actuatable hydraulic switching valve which is operatively connected, in particular hydraulically, to the control device and can be actuated mechanically, for example by means of a guide mechanism or the like. For further details on how such a switching valve and a connecting rod accommodating the switching valve can be designed, reference is hereto made to Austrian patent application A50757/2016 which describes such a switching valve as well as a connecting rod having such a switching valve.

A separate additional switching valve can in each also be provided in a connecting rod according to the invention for each valve of the control device; i.e. both for the first valve of the control device as well as for the second valve of the control device, for actuating the control device or, respectively, for actuating the first valve of the control device and the second valve of the control device separately.

The additional switching valve(s) and the control device are thereby preferably operatively connected and the first valve and the second valve as well as the additional switching valve(s) are in particular respectively designed such that a hydraulic medium return flow from the first hydraulic working chamber of the length-adjusting apparatus is blocked and the second hydraulic working chamber of the length-adjusting apparatus is drained in a first switching state of the control device and the first hydraulic working chamber of the length-adjusting apparatus is drained and a hydraulic medium return flow from the second hydraulic working chamber of the length-adjusting apparatus is blocked in a second switching state of the control device.

In a further advantageous configuration of an inventive connecting rod, the first valve of the control device and/or the second valve of the control device is a globe valve and comprises a valve body axially displaceable along a lifting axis, whereby the valve body can be pressed against a valve seat to block the hydraulic medium return flow from the associated hydraulic working chamber fluidly connected or connectable to the valve and lifted from the valve seat to drain the associated working chamber, wherein the lifting of the valve body off of the valve seat can preferably be effected by way of the respective adjusting piston of the valve.

Designing the respective first valve and second valve of the control device as globe valves enables inversely blocking the hydraulic medium return flow and draining the hydraulic working chambers of the length-adjusting apparatus in a particularly simple manner and thus a particularly simple length-adjusting apparatus control.

The lifting axis of the first valve of the control device and/or the second valve of the control device can thereby in principle run in any manner within the connecting rod in a connecting rod according to the invention; it particularly does not need to coin-cide with the adjusting axis of the respective valve and can also deviate from same.

A particularly advantageous configuration of an inventive connecting rod results when the first valve of the control device and the second valve of the control device are each globe valves and each have a valve body axially displaceable along a lifting axis, whereby the valve bodies can in each case be pressed against a valve seat to block the hydraulic medium return flow from the associated hydraulic working chamber fluidly connected or connectable to the valve and lifted from the valve seat to drain the associated working chamber, wherein the lifting of the respective valve body off of the valve seat can be effected by way of the respective adjusting piston of the valve, particularly when the connecting rod is designed such that a hydraulic medium return flow from the first hydraulic working chamber of the length-adjusting apparatus is blocked and the second working chamber is drained in a first switching state of the control device and the first hydraulic working chamber of the length-adjusting apparatus is drained and the hydraulic medium return flow from the second hydraulic working chamber of the length-adjusting apparatus is blocked in a second switching state of the control device.

In a further advantageous configuration of a connecting rod according to the invention, the lifting axis of at least one globe valve runs parallel to the crankshaft axis, preferably the lifting axes of all the globe valves of the control device run parallel to the crankshaft axis. The respective valve, in particular the valve body, can thereby in many cases be decoupled from the centrifugal forces occurring during a working stroke insofar as the centrifugal forces which occur no longer effecting an unwanted lifting of the valve body from the valve seat or an undesired pressing of the valve body onto the valve seat and thus an inadvertent opening and/or closing of the globe valve.

In particular, however, both the first adjusting axis of the first valve and the lifting axis of the first valve and/or the second adjusting axis of the second valve and the lifting axis of the second valve in each case run parallel to the crankshaft axis.

In a further advantageous configuration of an inventive connecting rod, the first valve of the control device and the second valve of the control device are in each case a globe valve, whereby in the first switching state of the control device, the valve body of the first valve bears on the valve seat and blocks a hydraulic medium return flow from the first hydraulic working chamber of the length-adjusting apparatus and the valve body of the second valve is lifted from the valve seat and the second hydraulic working chamber of the length-adjusting apparatus is drained, and whereby in the second switching state of the control device, the valve body of the first valve is lifted from the valve seat and the first hydraulic working chamber is drained and the valve body of the second valve bears on the valve seat and blocks a hydraulic medium return flow from the second hydraulic working chamber of the length-adjusting apparatus.

In a further advantageous configuration of an inventive connecting rod, the valve body of at least one globe valve is of at least partly spherical, conical or frustoconical form at least in one contact area where the valve body can be pressed against the valve seat, wherein the valve body is in particular a ball, a conical body or a truncated cone. The associated valve seat is preferably of corresponding design to the valve body, in particular in such a manner as to be able to ensure normal functioning of the respective valve. A conical or frustoconical valve body enables improved, in particular simplified, guiding of the valve body within the valve. In particular, with a conical or frustoconical valve body, the valve can be easily configured so as to prevent valve body tumbling without an additional tumble guide.

In a further advantageous configuration of an inventive connecting rod, the valve body of at least one globe valve is a separate component from the adjusting piston of the associated valve, whereby the lifting of the valve body off the valve seat can preferably be effected by the adjusting piston of the valve pushing the valve body away from the valve seat.

Preferably, the adjusting piston can thereby force the valve body directly away from the valve seat; i.e. directly or indirectly, without a connecting element being provided between the valve body and adjusting piston. In some cases, however, in particular to bridge a distance between the adjusting piston and the valve body, providing at least one connecting element, in particular a link rod or the like, between the adjusting piston and the valve body, via which the valve body can be indirectly or directly pushed away from the valve seat can be necessary. The connecting element is thereby preferably fixedly connected to the adjusting piston, whereby the connecting element can also be formed integrally with the adjusting piston.

The valve is thereby preferably configured, in particular the length of the connecting element dimensioned, such that in a first position of the adjusting piston, the valve body is lifted from the valve seat and the valve opened and, in a second position of the adjusting piston, the valve body bears on the valve seat and is in particular distanced from the connecting element and/or the adjusting piston so that the valve is closed in at least one direction of hydraulic medium flow from the valve body toward the valve seat, whereby a hydraulic medium return flow can be blocked in this direction.

In a further advantageous configuration of a connecting rod according to the invention, the valve body of at least one globe valve can lift off the valve seat against a valve body restoring force, whereby the valve preferably comprises a valve body resetting device for producing the valve body restoring force by means of which the pressing of the valve body on the valve seat can in particular also be effected. Preferably, the valve body resetting device is a return spring, in particular a return spring configured as a helical spring.

In a further advantageous configuration of an inventive connecting rod, the connecting rod comprises a hydraulic medium feed line, whereby the first hydraulic working chamber of the length-adjusting apparatus is preferably connected or connectable to the hydraulic medium feed line in fluid-communicating manner by at least the first valve of the control device designed as a globe valve and/or the second hydraulic working chamber of the length-adjusting apparatus is connected or connectable to the hydraulic medium feed line in fluid-communicating manner by at least the second valve of the control device designed as a globe valve, wherein lifting of the valve body of the associated globe valve from the valve seat can in particular be effected by the negative pressure in the associated working chamber and hydraulic medium can be drawn in through the globe valve of the control device fluidly connected or connectable to said working chamber via the hydraulic medium feed line.

Preferably, the spring constant of the valve body return spring is thereby selected such that a negative pressure in the associated hydraulic working chamber of the length-adjusting apparatus can effect the lifting of the valve body from the valve seat and hydraulic medium can be drawn into the working chamber through the valve.

In an alternative but likewise advantageous configuration of a connecting rod according to the invention, the valve body in at least one globe valve of the control device is in contrast fixedly connected to the adjusting piston, whereby the lifting of the valve body from the valve seat can in this case preferably be effected by the adjusting piston pulling the valve body away from the valve seat and the pressing of the valve body onto the valve seat in particular likewise effected by means of the adjusting piston, in particular by the adjusting piston pushing the valve body onto the valve seat.

The adjusting piston can thereby either be directly connected to the valve body or else the valve has a connecting element arranged in between, whereby the valve body is preferably fixedly connected to the adjusting piston via the connecting element in this case. The valve body can also be integrally formed with the connecting element and/or the adjusting piston.

If the valve body is fixedly connected to the adjusting piston, a valve body resetting device is no longer needed to press the valve body onto the valve seat since the pressing can be effected via the actuating piston. As a result, the structural length of the control device can again be significantly shortened.

With a thus configured valve, a negative pressure in the associated working chamber cannot effect any lifting of the valve body from the valve seat. No hydraulic medium can thus be drawn into the associated hydraulic working chamber via a valve configured in such a manner. Hence, a bypass line bypassing the valve is required so that the hydraulic medium required for the length adjustment can be supplied via the respective hydraulic working chamber of the length-adjusting apparatus.

Therefore, particularly when the control device comprises a valve with the valve body being fixedly connected to the adjusting piston, a further advantageous configuration of a connecting rod according to the invention provides for the hydraulic medium feed line to be connected or connectable in fluid-communicating manner to the first hydraulic working chamber of the length-adjusting apparatus and/or the second hydraulic working chamber of the length-adjusting apparatus preferably by means of a respective check valve, whereby hydraulic medium can be drawn into the respective hydraulic working chamber via the hydraulic medium feed line and check valve particularly by the negative pressure acting in the respective working chamber. In other words, in a further advantageous configuration of an inventive connecting rod, the hydraulic medium feed line is in each case connected or connectable in fluid-communicating manner to the first hydraulic working chamber of the length-adjusting apparatus and/or to the second hydraulic working chamber of the length-adjusting apparatus by means of a respective check valve, whereby hydraulic medium can be drawn into the respective hydraulic working chamber via the hydraulic medium feed line and check valve particularly by means of the given negative pressure in the associated working chamber, wherein this configuration is particularly advantageous when the control device comprises a valve in which the valve body is fixedly connected to the adjusting piston.

This feasibility can additionally be provided in the case of a globe valve having a valve body separate from the adjusting piston. In other words, in a globe valve having a valve body separate from the adjusting piston, hydraulic medium can preferably be drawn into the associated hydraulic working chamber both through the globe valve as well as via a bypass line and in particular via a check valve arranged in the bypass line.

In a further advantageous configuration of an inventive connecting rod, the first valve and/or the second valve of the control device is/are at least partly, preferably completely, accommodated in the connecting rod by means of a valve housing, wherein the valve housing is in particular screwed into the connecting rod.

In an alternative yet particularly advantageous configuration of a connecting rod according to the invention, the first valve and/or the second valve of the control device is accommodated in the connecting rod without a valve housing. Preferably, both the first valve as well as the second valve of the control device are each accommodated in the connecting rod without a valve housing, in particular directly inserted into the connecting rod. Directly inserting the first valve and/or the second valve has the advantage of no sealing measures needing to be made between the valve housing and connecting rod, whereby available space can be gained, particularly in the valve's longitudinal direction; i.e. parallel to the respective adjusting axis. As a result, the structural length of the control device can again be reduced considerably.

A reciprocating piston engine according to the invention is characterized in that it comprises a connecting rod according to the invention.

A vehicle with a reciprocating piston engine according to the invention is characterized in that it comprises a reciprocating piston engine according to the invention, in particular an inventive reciprocating piston internal combustion engine.

These and further features and advantages are evident from the claims and the description as well as from the drawings, wherein the individual features can in each case be realized on their own or combined in the form of subcombinations in an embodiment of the invention, and, provided same is technically feasible, can represent an advantageous as well as patentable implementation for which protection is likewise claimed.

Figure 2:
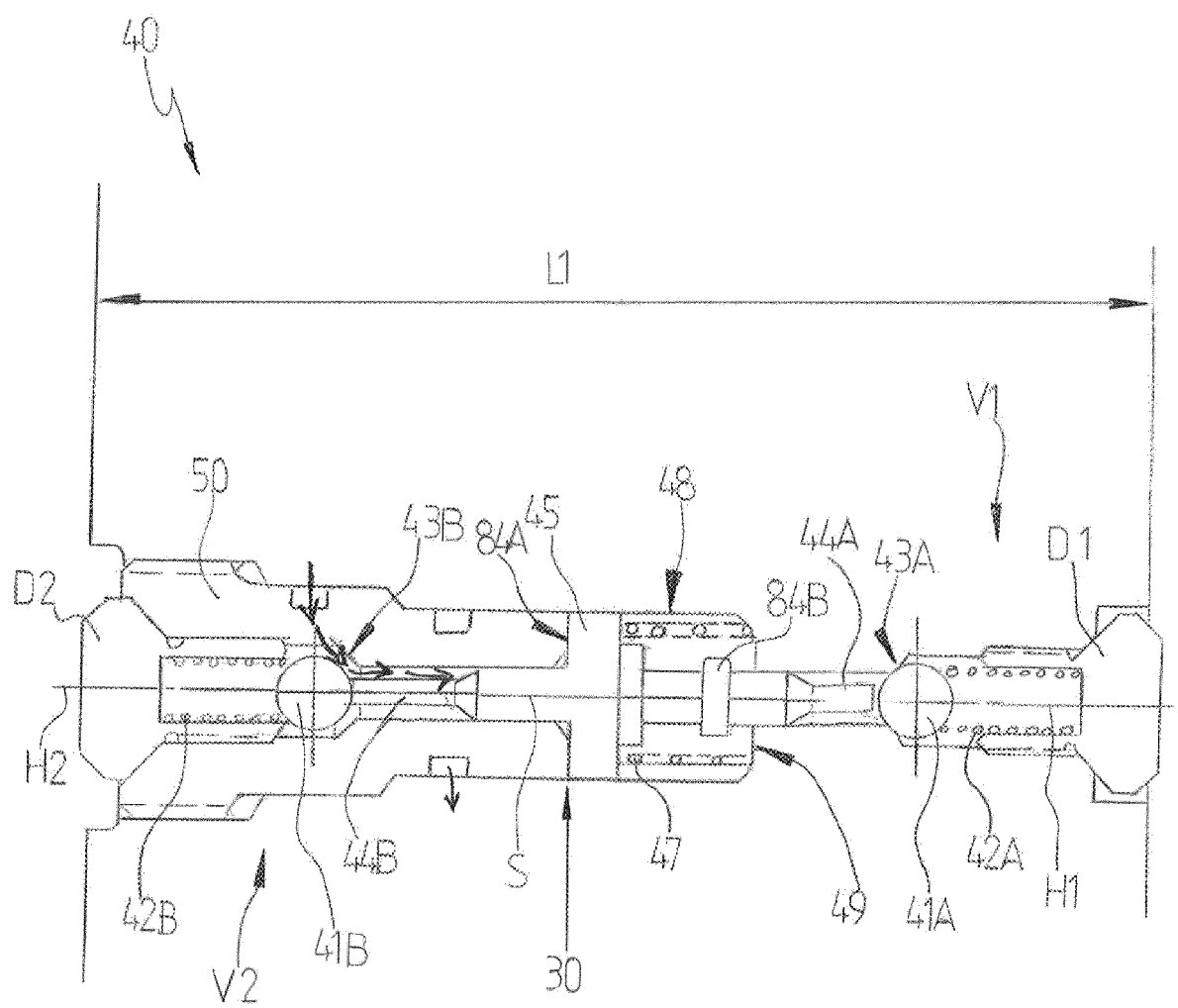
Figure 3:
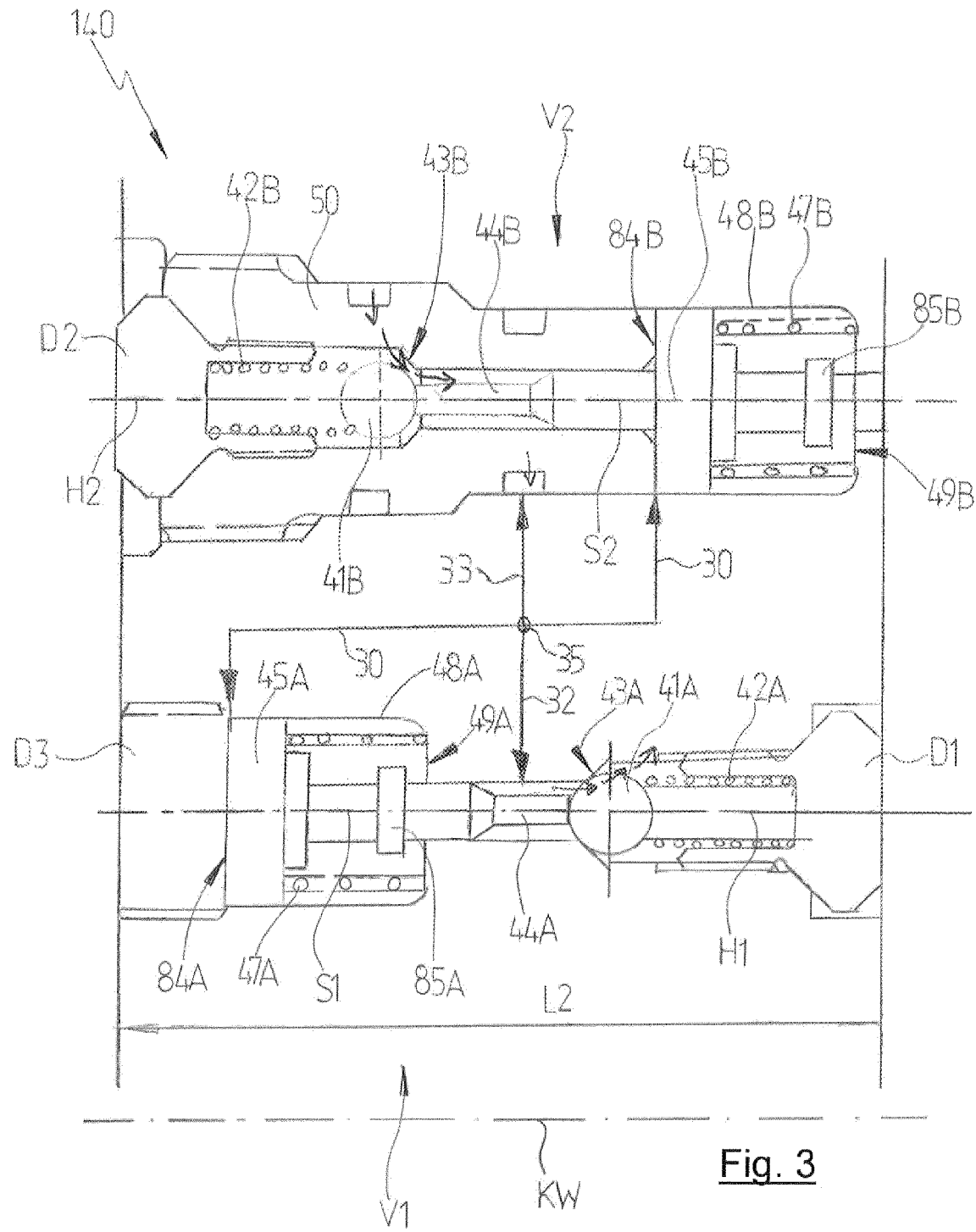
Figure 4:
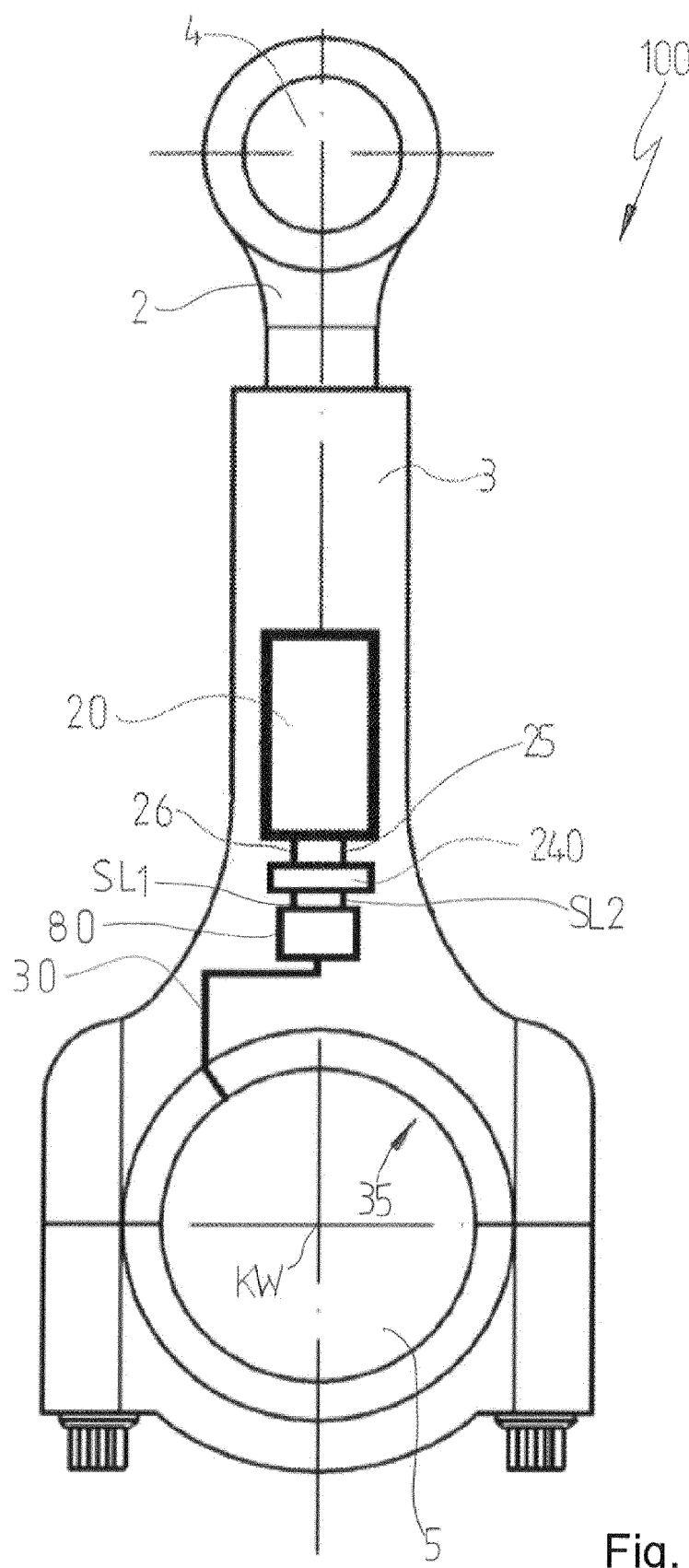
Figure 5:
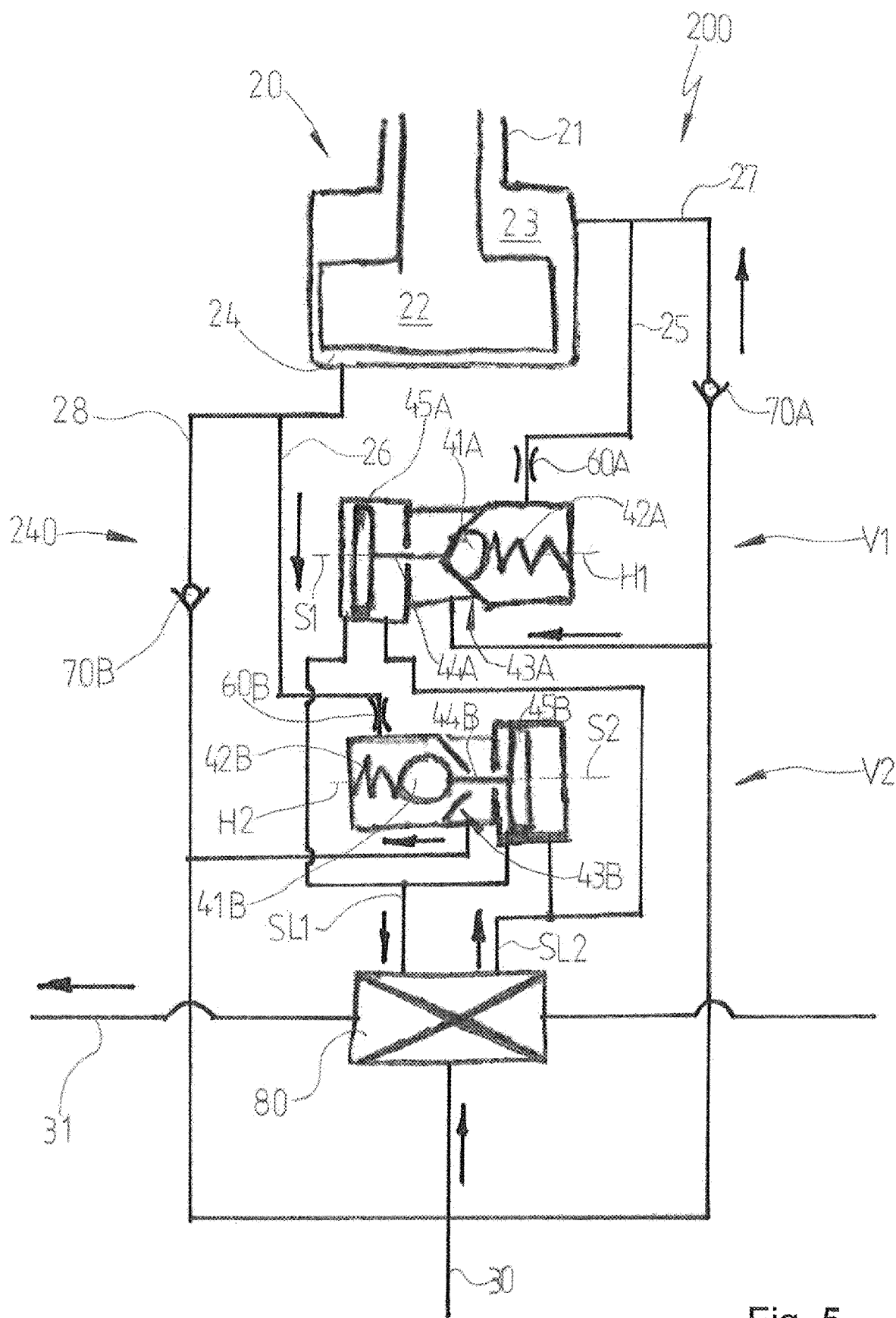
Figure 6:
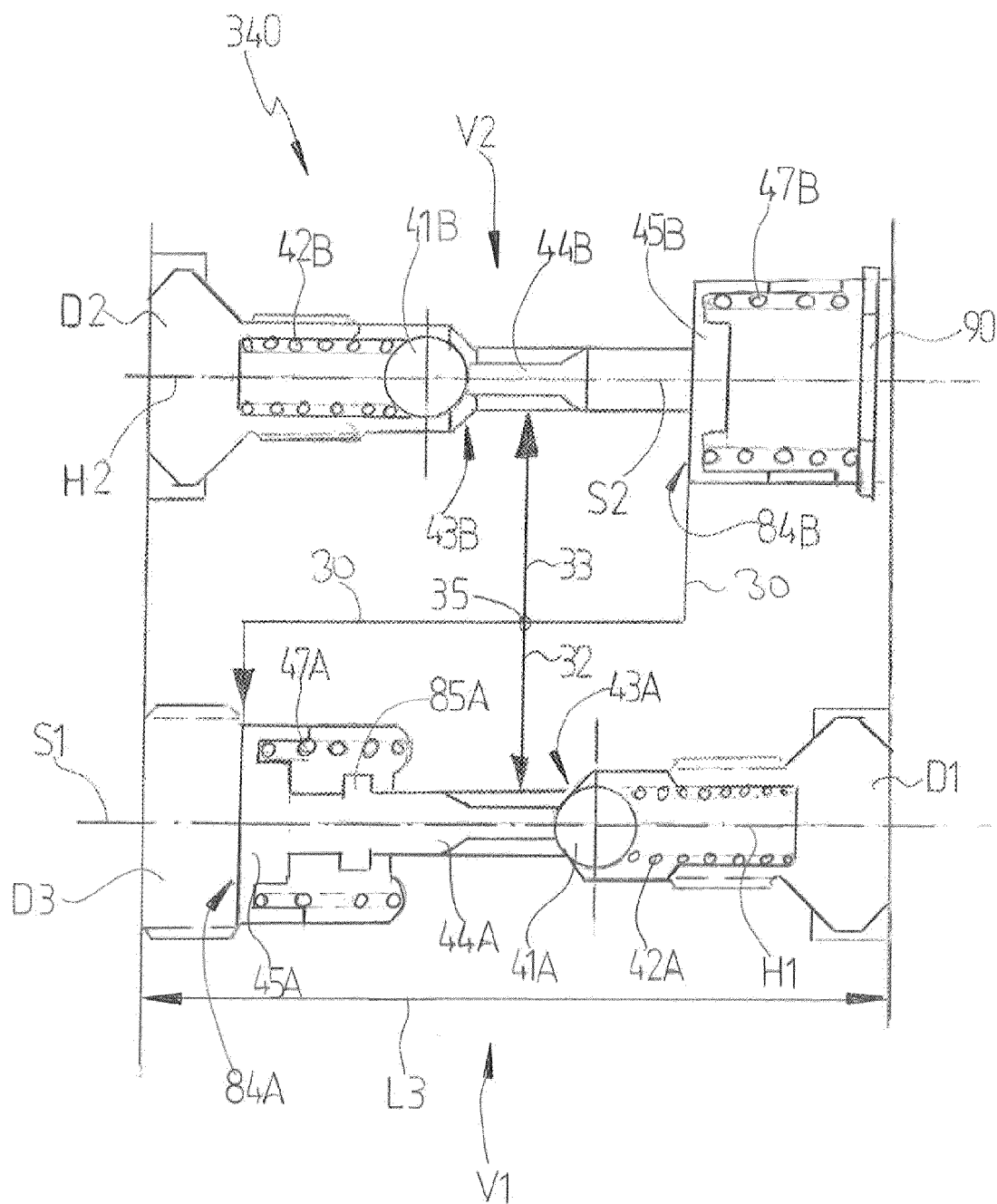
Figure 7:
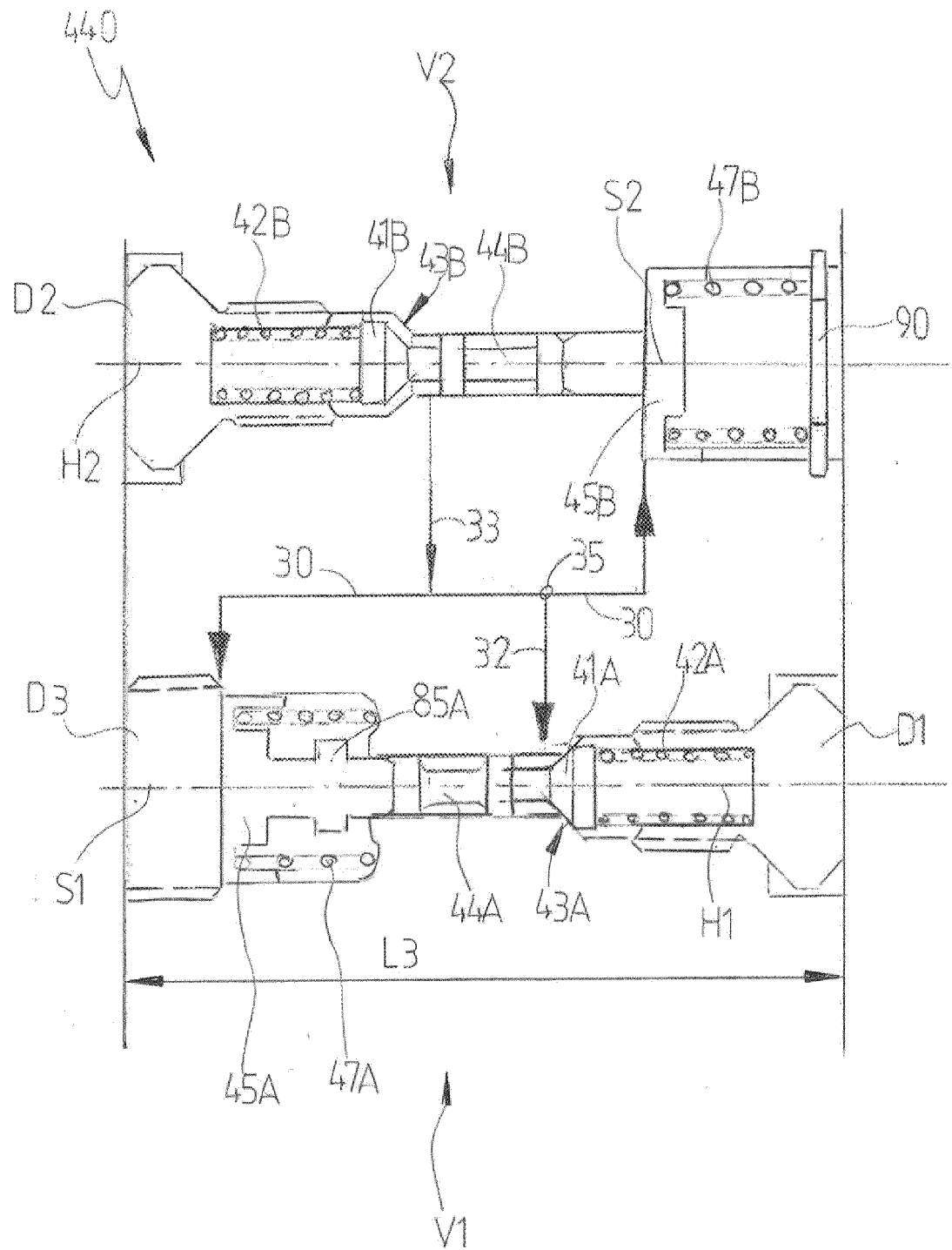
Figure 8:
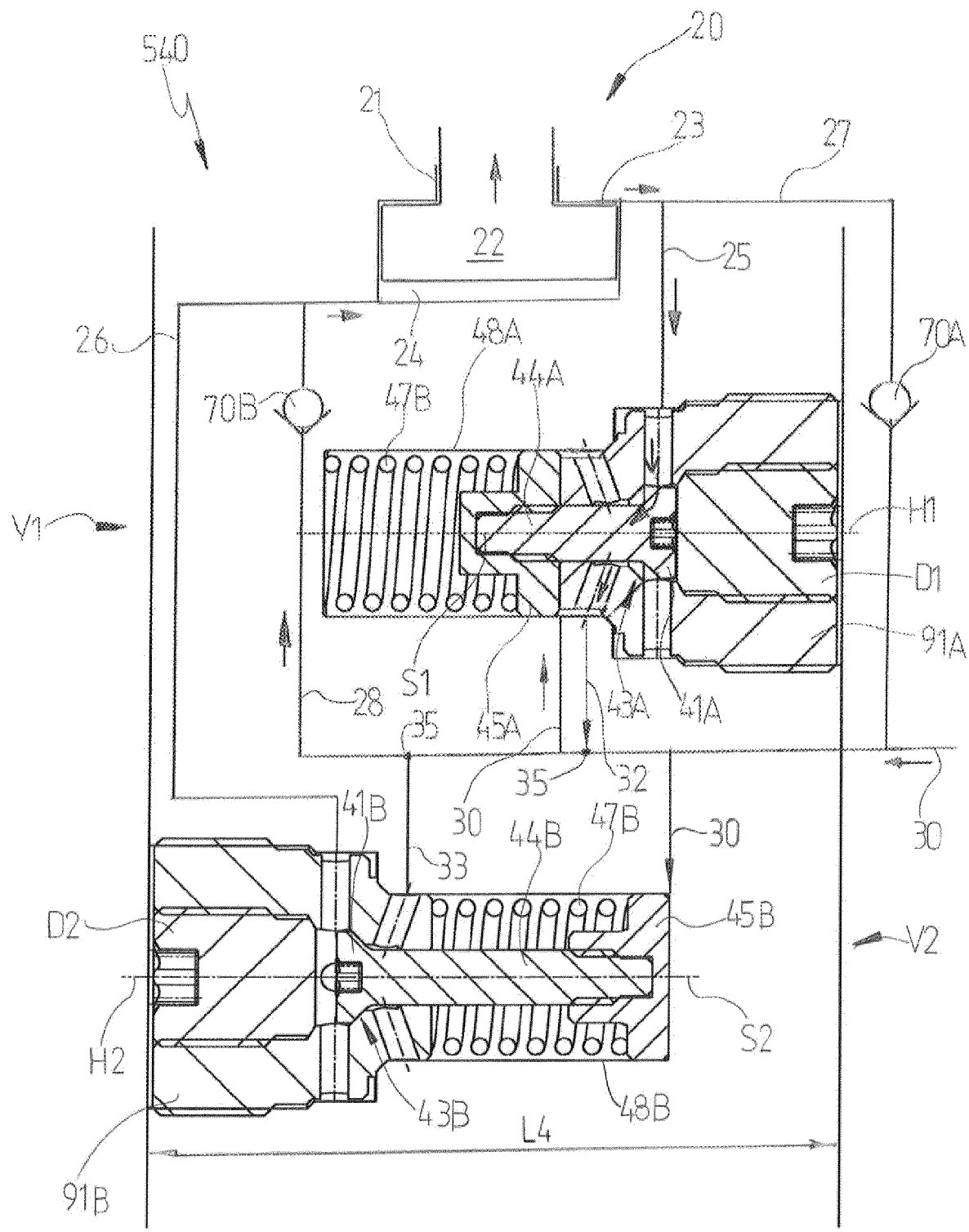
Figure 9:
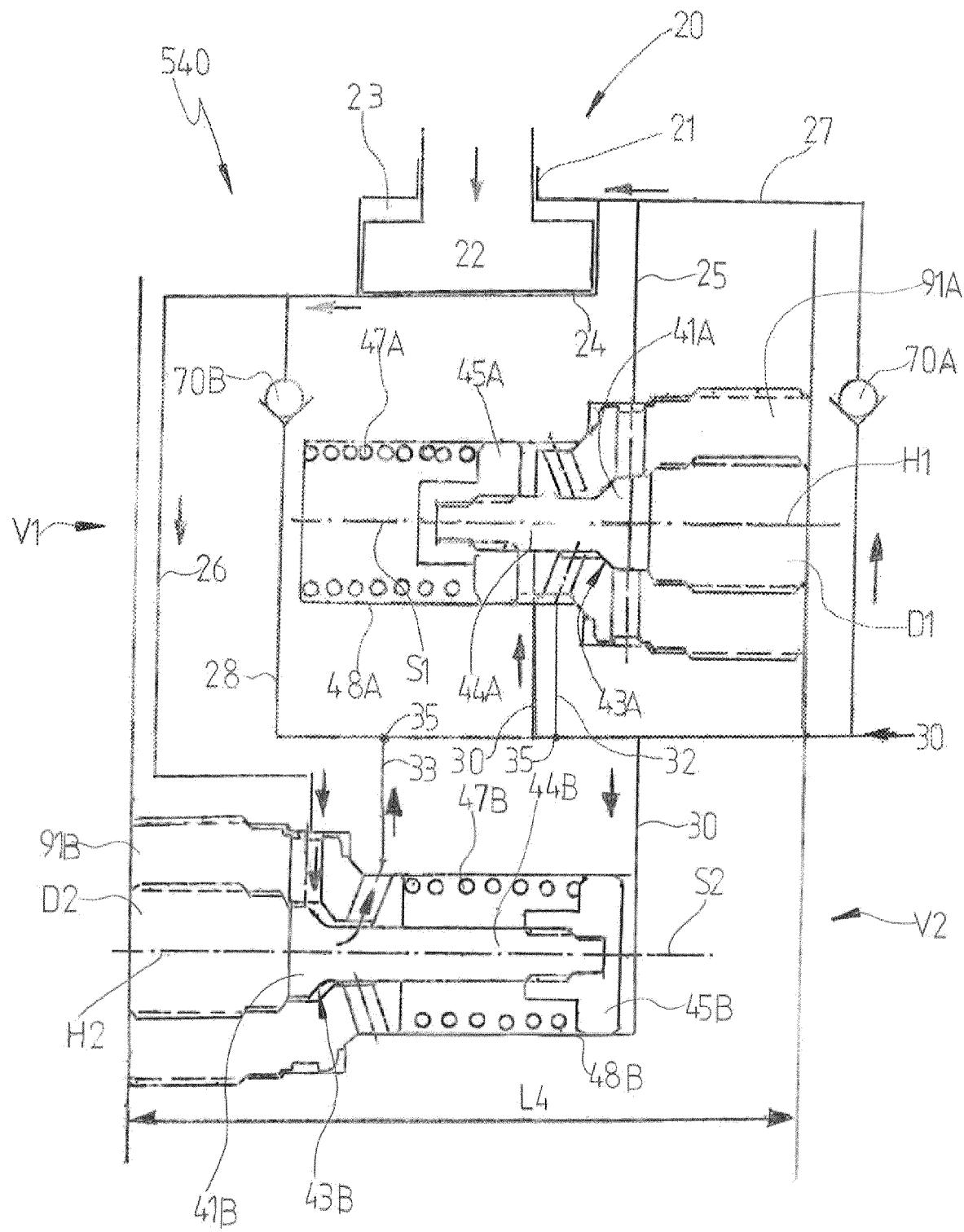

The invention will be described in greater detail in the following on the basis of non-limiting exemplary embodiments as depicted in the figures, whereby components having the same function have the same reference numerals. Shown at least partly schematically in the figures are:

FIG. 1 a prior art example of a length-adjustable connecting rod having a generic hydraulic length-adjusting apparatus shown n sectional view, FIG. 2 an enlarged sectional view of the control device from FIG. 1, FIG. 3 a control device of a first exemplary embodiment of an inventive connecting rod in sectional view, FIG. 4 a schematic representation of one exemplary embodiment of an inventive connecting rod, FIG. 5 a detail of the hydraulic system for adjusting the length of the inventive connecting rod from FIG. 4, FIG. 6 a control device of a further exemplary embodiment of an inventive connecting rod in sectional view, FIG. 7 a control device of a further exemplary embodiment of an inventive connecting rod in sectional view, FIG. 8 a sectional view of control device of a further exemplary embodiment of an inventive connecting rod in a second switching state of the control device, and FIG. 9 the control device from FIG. 8 in a first switching state.

For a better fundamental understanding of the functioning of a hydraulic length-adjusting apparatus of a connecting rod according to the invention, FIG. 1 shows an exemplary embodiment of a length-adjustable connecting rod as described in the previously mentioned WO 2016/203047 A1 which comprises a hydraulic length-adjusting apparatus 20 advantageously applicable to an inventive connecting rod having a first hydraulic cylinder 21, a piston 22, a first hydraulic working chamber 23 and a second hydraulic working chamber 24.

The connecting rod 1 has a divided connecting rod shaft with a first connecting rod shaft section 2 and a second connecting rod shaft section 3, whereby a small connecting rod eye 4 is provided on a piston-side end of the connecting rod 1, or first connecting rod shaft section 2 respectively, for connecting to a reciprocating piston of a reciprocating piston engine, in particular a reciprocating piston internal combustion engine, and a large connecting rod eye 5 is provided on a crankshaft-side end of the connecting rod 1, or second connecting rod shaft section 3 respectively, for connecting the connecting rod 1 to a crankshaft of the reciprocating piston engine. The crankshaft is not depicted in FIG. 1; its longitudinal axis, crankshaft axis KW, running normal to a longitudinal axis A of the connecting rod as well as normal to FIG. 1's plane of projection. A longitudinal center plane of the connecting rod 1 runs through the longitudinal axis A of the connecting rod 1 and extends normal to the crankshaft axis KW, thus parallel to and/or in the plane of projection of FIG. 1.

The first connecting rod shaft section 2 and the second connecting rod shaft section 3 are thereby telescopically displaceable into one another along a longitudinal axis A of the connecting rod 1, whereby the piston 22 of the length-adjusting apparatus 20 is fixed to the upper connecting rod shaft section 2 and the lower connecting rod shaft section 3 forms the hydraulic cylinder 21 of the length-adjusting apparatus 20 in which the piston 22 of the length-adjusting apparatus 20 is displaceably supported along the longitudinal axis A of the connecting rod 1. Depending on the position of the piston 22 of the length-adjusting apparatus 20 in the first hydraulic cylinder 21 of the length-adjusting apparatus 20, a different operative or respectively effective connecting rod length L is set which is defined by the distance of the rotational axes of connecting rod 1 about the piston pin or crankshaft respectively. A maximum change $\Delta L$ in the operative/effective connecting rod length L is determined by the maximal possible stroke of the piston 22 of the length-adjusting apparatus 20.

The piston 22 of the length-adjusting apparatus 20 is thereby configured as a double-acting piston 22, whereby the piston 22 of the length-adjusting apparatus defines a first hydraulic working chamber 23 and a second hydraulic working chamber 24 with the first hydraulic cylinder 21 of the length-adjusting apparatus 20.

For controlling the length-adjusting apparatus 20, the connecting rod 1 depicted in FIG. 1 comprises a control device 40 which controls a hydraulic medium feed from a first hydraulic medium feed line 30 into the first hydraulic working chamber 23 via a first hydraulic channel 25 as well as into the second hydraulic working chamber 24 of the length-adjusting apparatus 20 via a second hydraulic channel 26, whereby the hydraulic medium feed line 30 is supplied with hydraulic medium via a crankshaft-side connecting rod bearing 35 (only implied here). The first valve V1 is thereby connected in fluid-communicating manner to the first working chamber 23 of the hydraulic length-adjusting apparatus 20 via the first hydraulic channel 25 and the second valve V2 to the second hydraulic working chamber 24 of the length-adjusting apparatus 20 via the second hydraulic channel 26.

For a better understanding, FIG. 2 shows the control device 40 from FIG. 1 separately in an enlarged and more detailed representation. The first valve V1 and the second valve V2 are each designed as globe valves and each comprise a not further described valve chamber in which a respective valve body 41A/41B is arranged, whereby the valve bodies 41A, 41B can each be lifted from an associated valve seat 43A/43B along an associated lifting axis H1/H2 to drain the associated working chamber and can be pressed against the respective valve seat 43A/43B to block a hydraulic medium return flow of the associated working chamber by means of a valve body return spring 47A, 47B.

In this case, the valve bodies 41A and 41B are designed as balls and the valve seats 43A and 43B correspond thereto so as to in particular achieve a sufficient sealing function to block the hydraulic medium return flow.

For the actuating of the control device 40, the valve bodies 41A, 41B of the two valves V1 and V2 are operatively connected together by common link rods 44A and 44B axially displaceable at least between a first set position and a second set position along an adjusting axis S which are fixedly connected to an adjusting piston 45 axially displaceable along the adjusting axis S in a direction counter to an adjusting piston restoring force. To generate the adjusting piston restoring force, the control device comprises an adjusting piston return spring 47.

In the first set position of the link rods 44A/44B, or adjusting piston 45 respectively, the valve body 41A of the first valve V1 is lifted from the associated valve seat 43A/43B against the valve body restoring force by link rod 44A and in the second set position of the link rods 44A/44B, or adjusting piston 45 respectively, the valve body 41B of the second valve V2 is lifted by link rod 44B. The respectively associated hydraulic working chamber 23/24 of the length-adjusting apparatus 20 is thereby drained as hydraulic medium can drain off via the respective valve V1/V2 of the control device 40, as is shown in FIG. 2 using the example of the second valve V2 by the small arrows.

In the respective other position of the link rods 44A/44B, or adjusting piston 45 respectively, the respective valve body 41A/41B bears on valve seat 43A, as with first valve V1 in FIG. 2. As a result, a hydraulic medium return flow from the associated hydraulic working chamber 23/24 is blocked. Depending on whether the hydraulic medium return flow from the first hydraulic working chamber 23 of the length-adjusting apparatus is blocked and the second hydraulic working chamber 24 of the length-adjusting apparatus is drained or vice versa, either a short effective connecting rod length L or a long connecting rod length L is set.

The adjusting piston 45 of the control device 40 thereby assumes the first set position or the second set position as a function of hydraulic medium pressure acting on the actuating piston, which usually corresponds to applied engine oil pressure in the reciprocating piston internal combustion engine, wherein the hydraulic medium is supplied to the adjusting piston 45 via the hydraulic medium feed line 30 (also see FIG. 1). Provided stop elements 84A and 84B can ensure that a defined maximum adjustment stroke of the adjusting piston 45 is not exceeded.

At a low pressure level, the hydraulic pressure is insufficient to axially displace the adjusting piston 45 against the adjusting piston restoring force such that the adjusting piston 45 assumes the first set position, whereby a first effective connecting rod length L is set. A sufficiently high pressure level is able to overcome the restoring force and the adjusting piston assumes the second set position and a second effective connecting rod length L is set.

In other words, the effective connecting rod length L and thereby the associated compression ratio is thus set in a connecting rod with a control device 40 as described above as a function of a given hydraulic medium pressure in the reciprocating piston engine, in particular as a function of acting engine oil pressure.

Reference is made in particular to the aforementioned WO 2016/203047 A1 for further detailed information on the functioning of above-described control device 40.

The individual components of the control device 40, in particular first valve V1 and second valve V2, are thereby arranged relative one another, in particular one behind the other or respectively in a row, such that the two lifting axes H1 and H2 each coincide with the adjusting axis S of the common adjusting piston 45. This thereby results in a first structural length L1 of the control device 40 in the direction of the adjusting axis S and hence a corresponding space requirement.

The second valve V2 of the control device 40 is accommodated in the connecting rod by means of a valve housing 50 screwed into the connecting rod, whereby the valve housing forms a control cylinder 48 in which the adjusting piston 45 can be axially displaced along its adjusting axis S and its cylinder base 49 supports the adjusting piston return spring 47. Valve body 41B as well as valve body return spring 42B of the second valve V2 are held in the valve housing 50 by a pretensioning force via a cap D2 screwed into the valve housing 50. Valve body 41A as well as valve body return spring 47A are held directly in the connecting rod by a cap D1 based on the same principle.

The space requirement or respectively structural length L1 of the control device 40 is thereby greater than a connecting rod width in a direction parallel to a crankshaft axis KW (see FIG. 1) with respect to the functional installed state of the connecting rod 1 in a reciprocating piston engine. The control device 40 can therefore not be arranged with adjusting axis S or respectively lifting axes H1 and H2 parallel to the crankshaft axis KW but rather only in a plane extending perpendicular to the crankshaft axis KW or inclined to the crankshaft axis KW. This has the consequence of the adjusting piston 45 and in particular valve bodies 41A and 41B of the control device 40 being able to be axially displaced by the acting centrifugal forces during a working stroke at high rotational speeds, in particular speeds higher than approximately 3000 rpm, whereby unintentional unwanted opening of the two valves can occur when one of the valve bodies 41A, 41B is lifted from the associated valve seat 43A, 43B. Although valve V1, V2 sensitivity in terms of unwanted opening can be reduced to a slight extent by increasing the spring constant of the valve body return spring 47A, 47B, this can only occur to a limited extent since a restoring force which is too high impedes the opening or, respectively, reliable opening is no longer possible at too high of a restoring force.

FIG. 3 shows a sectional view of a control device 140 of a first exemplary embodiment of an inventive connecting rod where, in contrast to previously described control device 40, the first valve V1 and the second valve V2 of the control device 140 are not each arranged one behind the other; i.e. in a row, but rather such that the adjusting axes S1 and S2 of the two adjusting pistons 45A and 45B do not coincide but instead differ, whereby both two valves V1 and V2 of the control device 140 are allocated its own respective adjusting piston 45A/45B.

The control device 140 basically functions according to the same principle as the previously described control device 40, only with each valve V1, V2 being able to be actuated by its own separate adjusting piston 45A/45B as explained above. Both the first adjusting piston 45A of the first valve V1 as well as the second adjusting piston 45B of the second valve V2 are thereby respectively axially displaceable along an associated first adjusting axis S1 or second adjusting axis S2 against an adjusting piston restoring force generated by a return spring 47A/47B upon sufficient acting hydraulic medium pressure, wherein the two adjusting pistons 45A and 45B can likewise each be subjected to hydraulic medium pressure via the hydraulic medium feed line 30, whereby the hydraulic medium feed line can be supplied with hydraulic medium from the crankshaft-side connecting rod bearing, which is only implied here by reference numeral 35.

In the first switching state of the control device 140 shown in FIG. 3, hydraulic medium can be supplied via hydraulic line 32 and first valve V1 to the first hydraulic working chamber of the length-adjusting apparatus connected in fluid-communicating manner to the first valve V1, as indicated by the small arrows, when there is sufficient acting negative pressure in the associated hydraulic working chamber to effect a lifting of the valve body 41A from the valve seat 43A, wherein the hydraulic medium is thereby conducted to the associated hydraulic working chamber of the length-adjusting apparatus through the first valve V1. At the same time, hydraulic medium can be drawn out of the second working chamber of the length-adjusting apparatus in this switching state through the second valve V2 and via hydraulic line 33, particularly into connecting rod bearing 35.

Correspondingly, the first hydraulic working chamber of the length-adjusting apparatus connected in fluid-communicating manner to the first valve V1 can be drained in the second switching state of the control device 140 via hydraulic line 32 and the second hydraulic working chamber connected in fluid-communicating manner to the second valve V2 supplied with hydraulic medium via hydraulic line 33.

As with the control device 40 described above, a hydraulic medium pressure level at which the adjusting piston restoring force of the adjusting piston return spring 47A/47B of the respective valve V1/V2 can be overcome results in an axial displacement of the adjusting piston 45A/45B along the associated first adjusting axis S1 or second adjusting axis S2 respectively, whereby the first valve V1 and the second valve V2 of the control device 140 are thereby of inverse configuration such that one of the two valves V1 and V2 in each case opens as a result of the axial displacement of the two adjusting pistons 45A and 45B due to the valve body 41A/41B lifting off the associated valve seat 43A/43B and the other valve V1/V2 is blocked in at least one direction by the respective valve body 41A/41B pressing on the associated valve seat 43A/43B.

In the control device 140 shown in FIG. 3, the second valve V2 closes and the first valve V1 opens at a hydraulic medium pressure level at which the respective adjusting piston restoring force of the adjusting piston return springs 47A and 47B can be overcome since an axial displacement of the second adjusting piston 45B of the second valve V2 effects a displacing of the adjusting piston 45B to the right relative to the depiction in FIG. 3, whereby the link rod 44B fixedly connected to adjusting piston 45B is likewise displaced to the right and, upon the adjusting piston 45B reaching its end position, no longer presses against the valve body 41B of the second valve V2 and thus no longer lifts same from the associated valve seat 43B. The valve body 41B is also forced back against the valve seat 43B by the valve body return spring 42B.

A hydraulic medium pressure level at which the adjusting piston restoring force of the adjusting piston return spring 47A can be overcome likewise effects a displacing of the first adjusting piston 45A of the first valve V1 to the right relative to the depiction in FIG. 3 and, as a result, also a rightward displacing of the link rod 44A fixedly connected to the adjusting piston 45A. The valve body 41A of the first valve thereby lifts along lifting axis H1 from the associated valve seat 43A of the first valve against the valve body restoring force generated by the valve body return spring 42A so that the first valve opens.

If the hydraulic medium pressure on the respective adjusting pistons 45A and 45B of the first valve V1 and the second valve V2 is respectively insufficient to overcome the adjusting piston restoring force, as in the state depicted in FIG. 3, the adjusting piston return springs 47A and 47B in each case push the associated adjusting piston 45A/45B to the left, relative to the depiction in FIG. 3, into the other end position in which the valve body 41B of the second valve V2 is lifted along lifting axis H2 from the respective valve seat 43B against the valve body restoring force by means of the link rod 44B. The second valve V2 opens as a result. The adjusting piston 45A of the first valve is likewise displaced to the left, relative to the depiction in FIG. 3, also by the adjusting piston return spring 47A, in particular along first adjusting axis S1. This thereby pulls link rod 44A back from the valve body 41A. The valve body 41A can consequently be pressed against the associated valve seat 43A by means of the valve body return spring 42A, whereby the first valve V1 is closed in at least one direction. In order to ensure that the adjusting pistons 45A and 45B do not exceed a respective maximum stroke, the control device likewise comprises stop elements 84A, 85A, 84B and 85B.

The first valve V1 and the second valve V2 are thereby arranged one above the other in a vertical plane in the control device 140 depicted in FIG. 3, in particular such that the first adjusting axis S1 of the first valve V1 runs parallel to the second adjusting axis S2 of the second valve V2. As a result, control device 140 is of shorter construction than the above-described control device 40, whereby the control device 140 shown in FIG. 3 exhibits a second structural length L2.

The shorter structural length L2 of the control device 140 from FIG. 3 has the advantage of the control device being able to be arranged in the connecting rod in such a manner that the first adjusting axis S1 and the second adjusting axis S2 run parallel to the crankshaft axis KW of the connecting rod. A decoupling of the control device 140, in particular valves V1 and V2, from the centrifugal forces occurring during a working stroke can thereby be effected. Doing so has the advantage of being able to prevent an unintentional axial displacing of adjusting piston 45A and 45B along the respective adjusting axis S1 and S2 as well as an unintentional lifting of the valve body 41A/41B from the respective valve seat 43A/43B or, respectively, an unwanted pressing onto the respective valve seat 43A/43B and, as a result, an unwanted opening or closing of valves V1 and V2.

A similarly configured valve housing 50 is provided for the second valve V2 as in the control device 40 from FIG. 2 for the arranging of the two valves V1 and V2 of the control device in an inventive connecting rod.

The valve housing 50 of the second valve V2 is screwed into the connecting rod while the first valve V1 is accommodated directly by the connecting rod itself; i.e. without a valve housing in between. The valve body 41B as well as the valve body return spring 42B of the second valve V2 are held in the valve housing 50 by a pretensioning force via a cap D2 screwed into the valve housing 50. The valve body 41A as well as the valve body return spring 47A are held directly in the connecting rod by a cap D1 based on the same principle.

As in the control device 40 from FIG. 2, the valve housing 50 thereby forms a control cylinder 48B in which the adjusting piston 45B of the second valve can be axially displaced along its adjusting axis S2 and its cylinder base 49B supports the adjusting piston return spring 47B. Adjusting piston 45A is in contrast accommodated in a control cylinder 48A formed by the connecting rod, wherein the adjusting piston return spring 47A is likewise supported on the associated cylinder base 49A. The adjusting piston 45A of the first valve V2 or, respectively, the control cylinder 48A in which the adjusting piston 45A can be axially displaced is thereby sealed to the outside by means of a cap D3 screwed into the connecting rod. To ensure good guidance of the valve bodies 41A and 41B, the valves V1 and V2 each further comprise a not shown tumble guide.

The adjusting pistons 45A and 45B of the first valve V1 and the second valve V2 are thereby designed as single-acting adjusting pistons 45A and 45B and hydraulic medium can only act on the far side of the adjusting piston 45A/45B from the adjusting piston return spring 47A/47B. In consequence thereof, two different hydraulic medium pressure levels are necessary to actuate the control device 140, in particular to actuate the first valve V1 and the second valve V2; i.e. to open and close the two valves V1 and V2, in particular one pressure level at which the respective adjusting piston restoring force cannot be overcome and one pressure level at which the adjusting piston restoring force produced by the respective adjusting piston return spring 47A/47B can be overcome.

FIG. 4 shows a schematic representation of one exemplary embodiment of an inventive connecting rod 100 comprising a control device 140 which enables control of the length-adjusting apparatus 20 independently of a given hydraulic medium pressure level. To that end, the control device 240 comprises a first valve V1 designed as a globe valve and a second valve V2 likewise designed as a globe valve as well as also a switching valve 80 for actuating the control device 240, wherein the first valve V1 and the second valve V2 each comprise a double-acting adjusting piston 45A/45B (see FIG. 5), arranged in each case axially adjustably along an adjusting axis S1/S2 in a control chamber not described to any greater degree. The first valve V1 is thereby connected or connectable to the first hydraulic working chamber of the length-adjusting apparatus 20 in fluid-communicating manner by a first hydraulic channel 25 and the second valve V2 to the second hydraulic working chamber of the length-adjusting apparatus 20 by a second hydraulic channel 26.

In this case, with the inventive connecting rod 100 depicted in FIG. 4, the switching valve 80 is an electromagnetically actuatable hydraulic switching valve for the hydraulic actuation of the control device 240, wherein the switching valve 80 can be supplied with hydraulic medium from the crankshaft-side connecting rod bearing 35 via hydraulic medium feed line 30 and is in each case connected in fluid-communicating manner to the first valve V1 and the second valve V2 of the control device 240 by two respective control lines SL1 and SL2.

The two control lines SL1 and SL2 are thereby connected in each case to the first valve V1 and the second valve V2 of the control device 240 in such a manner that the adjusting pistons 45A and 45B of the first valve V1 and the second valve V2 can each be subjected to a control medium pressure differential.

Depending on the given control medium pressure differential, the first adjusting piston 45A and the second adjusting piston 45B assume the respective first set position or second set position, wherein the first valve V1 and second valve V2 in control device 240 are also of inverse configuration and hydraulically coupled to the switching valve 80 such that the associated valve body 41A/41B lifts from the associated valve seat 43A/43B in one of the two valves V1/V2 and the valve body 41A/41B of the other valve V1/V2 presses against the associated valve seat 43A/43B.

The control medium pressure differential on the two adjusting pistons 45A and 45B needed to actuate the control device is thereby applied by means of the switching valve 80, whereby the switching valve 80 is designed to drain the control chambers of the two valves V1/V2 fluidly connected to the first control line SL1 in the first switching state as depicted in FIG. 5 and draw off hydraulic medium via a drainage 31 and supply hydraulic medium to the respective control chambers connected to the second control line SL2 via hydraulic medium feed line 30. The adjusting pistons 45A and 45B thereby assume the first set position in each case in which valve body 41B is lifted from the associated valve seat 43B and valve body 41A of the first valve V1 is pressed onto the associated valve seat 43A and thus blocks a hydraulic medium return flow from the first working chamber 23 of the length-adjusting apparatus 20 and the second hydraulic working chamber of the length-adjusting apparatus 20 is drained.

In the second switching state of the switching valve 80, the control chambers of the first valve V1 and the second valve V2 fluidly connected to the first control line SL1 are correspondingly supplied with hydraulic medium via hydraulic medium feed line 30 and the respective other control chambers fluidly connected to the second control line SL2 drained via switching valve 80 so that the respective adjusting pistons 45A/45B assume the second set position in which valve body 41A is lifted from the associated valve seat 43A and valve body 41B of the second valve V2 is pressed onto the associated valve seat 43B and a hydraulic medium return flow from the second working chamber 24 of the length-adjusting apparatus 20 is thus blocked and the first hydraulic working chamber 23 of the length-adjusting apparatus 20 is drained.

The additional switching valve 80 enables an actuating of the control device 240 independently of the respectively given hydraulic medium pressure level in the reciprocating piston engine and thus also a lengthwise adjustment independently of the operating state of the reciprocating piston engine, whereby a condition for utilizing an additional switching valve 80 is that the first adjusting piston 45A and the second adjusting piston 45B of the first valve V1 and the second valve V2 are each designed as double-acting adjusting pistons 45A and 45B.

In the depiction shown in FIG. 5, the control device 240 is in a first switching state in which a hydraulic medium return flow from the first hydraulic working chamber 23 of the length-adjusting apparatus 20 is blocked by the first valve V1 and the second hydraulic working chamber 24 is drained by means of the second valve V2.

In the first switching state of the control device 240 shown in FIG. 5, hydraulic medium can continue to be drawn into the first hydraulic working chamber 23 from the hydraulic medium feed line 30 with each downstroke of the connecting rod by way of the negative pressure produced in the first hydraulic working chamber 23 of the length-adjusting apparatus 20 during the downstroke until the minimum effective connecting rod length is reached.

The hydraulic medium can thereby be drawn in through throttle 60A and first hydraulic channel 25 on the one hand via a bypass line 27 and check valve 70A and, on the other hand, via first valve V1, whereby the spring constant of the valve body return spring 42A of the first valve V1 is dimensioned such that the suction can overcome the valve body restoring force and a lifting of the valve body 41A of the first valve V1 from the associated valve seat 43A and thus an opening of the first valve V1 can be effected.

To be understood as a throttle or respectively throttle valve in the context of the present disclosure is either a separate component or a throttling section of a line.

In the second switching state of the control device, in which a hydraulic medium return flow from the second hydraulic working chamber 24 of the length-adjusting apparatus 20 is blocked by the second valve V2 while the first working chamber is drained, hydraulic medium can correspondingly continue to be drawn into the second hydraulic working chamber 24 from hydraulic medium feed line 30 with each upstroke of the connecting rod by way of the negative pressure produced in the second hydraulic working chamber 24 of the length-adjusting apparatus 20 during the upstroke until the minimum effective connecting rod length is reached.

In this case, the hydraulic medium can be drawn in through the throttle 60B and over the second hydraulic channel 26 on the one hand via a bypass line 28 and the check valve 70B and, on the other hand, via the second valve V2, whereby the spring constant of the valve body return spring 42B of the second valve V2 is likewise dimensioned such that the suction can overcome the valve body restoring force and a lifting of the valve body 41B of the second valve V2 from the associated valve seat 43B and thus an opening of the second valve V1 can be effected.

FIG. 6 shows a control device 340 of a third exemplary embodiment of an inventive connecting rod in sectional view, whereby this control device is in principle structured exactly the same as the control device 140 discussed in detail above with respect to FIG. 3. In contrast to the control device 140 depicted in FIG. 3, both the first valve V1 as well as the second valve V2 in the control device 340 depicted in FIG. 6 can be accommodated directly in the connecting rod; i.e. directly, without any additional valve housing, whereby an axially acting retaining element 90 is provided to support the adjusting piston return spring 47B. The cap D2 also holds the valve body 41B and the valve body return spring 42B in the connecting rod under a pretensioning force, whereby the cap D2 is screwed directly into the connecting rod instead of the valve housing in this case. Doing away with the valve housing also enables dispensing with space-occupying sealing measures, whereby the structural length of the control device 340 can be even further reduced to structural length L3.

FIG. 7 shows a control device 440 of a fourth exemplary embodiment of an inventive connecting rod in sectional view, whereby this control device 440 substantially corresponds to the control device from FIG. 6 and only differs from same in the geometry of the valve bodies 41A and 41B and associated valve seats 43A and 43B. In the control device 440 depicted in FIG. 7, the valve bodies 41A and 41B are of frustoconical shape in their regions which are pressable onto the associated valve seat 43A/43B whereas the valve bodies in control device 340 from FIG. 6 as well as the previously described control devices 40, 140, 240 and 340 are each formed by balls 41A, 41B. The frustoconical valve bodies 41A and 41B enable a particularly simple guidance such that no additional tumbling guide is necessary as is the case with ball valve bodies.

FIGS. 8 and 9 show a control device 540 of a fifth exemplary embodiment of an inventive connecting rod, whereby the control device 540 is depicted in a second switching state in FIG. 8 and in a first switching state in FIG. 9. In this case, the valve bodies 41A and 41B of the first valve V1 and the second valve V2 are not respective components separate from the adjusting piston 45A/45B but rather fixedly connected to the adjusting piston 45A/45B, in particular in a screw connection, whereby the valve bodies 41A and 41B are in each case integrally formed with a link rod 44A/44B, wherein the link rod 44A/44B is in each case screwed to the associated adjusting piston 45A, 45B.

This has the advantage of valve body resetting devices no longer being necessary since, given the appropriate geometric configuration, in particular an appropriately selected distance between valve bodies 41A and 41B, or adjusting pistons 45A and 45B respectively, the valve bodies 41A and 41B are automatically pressed onto the associated valve seats 43A and 43B by the axial displacing of adjusting body 45A and 45B. As a result, the control device 540 has an even smaller structural length L4 than the previously described control devices 140, 240, 340 and 440.

As with the previously described valves V1 and V2 of the previously described control devices 140, 340 and 440, the adjusting pistons 45A and 45B of the first valve V1 and the second valve are also each designed as single-acting adjusting pistons 45A and 45B in this case which can each be acted upon by hydraulic medium via hydraulic medium feed line 30 and are each axially displaceable along an associated adjusting axis S1/S2, in particular in a direction counter to an adjusting piston restoring force as generated by means of an adjusting piston return spring 47B/47A.

The two valves V1 and V2 are likewise accommodated directly in the connecting rod, in particular in a respective blind hole forming the control cylinder 48A/48B. The valve seats 43A and 43B are each part of a valve sleeve 91A/91B screwed into the connecting rod which seals each control cylinder 48A/48B to the outside together with a cap D1/D2 screwed into the valve sleeve 91A, 91B.

If, as depicted in FIG. 8, the valve body 41A of the first valve V1 is lifted from the associated valve seat 43A in the second switching state of the control device 540, the first hydraulic working chamber 23 of the length-adjusting apparatus 20 fluidly connected to the first valve V1 is drained, whereby the hydraulic medium from the first hydraulic working chamber 23 can thereby be drained off through the first valve V1 via the first hydraulic channel 25 and hydraulic line 32 into the crankshaft-side connecting rod bearing 35.

In this switching state of the control device 540, the valve body 41B of the second valve V2 is pressed onto the associated valve seat 43B at the same time, whereby a hydraulic medium return flow from the second hydraulic working chamber 24 of the length-adjusting apparatus 20 is blocked. The first valve V1 and the second valve V2 each comprise drainage channels via which hydraulic medium can be drawn off to drain the respectively associated hydraulic working chamber 23/24 of the length-adjusting apparatus 20.

Since each valve body 41A and 41B is fixedly connected to the adjusting piston 45A/45B in this control device 540, in particular by the valves V1 and V2 designed as such, no respective valve body 41A/41B can be lifted from the associated valve seat 43A/43B by a negative pressure generated in a hydraulic working chamber such that no hydraulic medium can be drawn into the respective hydraulic working chamber through the respective first valve V1 and second valve V2.

Therefore, a respective bypass line 27/28 is provided in the control device 540 for filling the hydraulic working chambers 23 and 24, via which hydraulic medium can be drawn past the first valve V1 and second valve V2 into the respective hydraulic working chamber 23/24 of the length-adjusting apparatus. A respective check valve 70A/70B is thereby arranged in the two bypass lines 27 and 28 to prevent hydraulic medium return flow from the respective working chamber 23/24 of the length-adjusting apparatus 20.

In other words, in the control device 540 depicted in FIGS. 8 and 9, the hydraulic working chambers 23 and 24 of the length-adjusting apparatus 20 are not filled via both the associated valve V1/V2 of the control device 540 and a bypass line 27/28, as in the previously described control devices 140, 240, 340 and 440, but rather in each case only by means of the associated bypass line 27/28 and respective check valve 70A/70B.

In the first switching state of the control device 540 depicted in FIG. 9, the valve body 41A of the first valve V1 is accordingly pressed onto the associated valve seat 43A by adjusting piston 45A such that a hydraulic medium return flow from the first hydraulic working chamber 23 of the length-adjusting apparatus 20 is blocked while valve body 41B of the second valve V2 is lifted by pulling away from the valve seat 43B, whereby the draining of the second hydraulic working chamber 24 of the length-adjusting apparatus 20 is effected. The hydraulic medium is thereby drained off through the second valve V2 via the second hydraulic channel 26 by hydraulic line 33 into the crankshaft-side connecting rod bearing 35.

Obviously, a plurality of modifications, in particular structural modifications, are possible without departing from the scope of the claims.

LIST OF REFERENCE NUMERALS 1 length-adjustable connecting rod with hydraulic length-adjusting apparatus from the prior art
100 connecting rod according to the invention
200 detail of a hydraulic system for an inventive connecting rod
2 first connecting rod shaft section
3 second connecting rod shaft section
4 small connecting rod eye
5 large connecting rod eye
20 hydraulic length-adjusting apparatus
21 first hydraulic cylinder
22 piston
23 first hydraulic working chamber of the length-adjusting apparatus
24 second hydraulic working chamber of length-adjusting apparatus
25 first hydraulic channel
26 second hydraulic channel
27 bypass to the first hydraulic working chamber of the length-adjusting apparatus
28 bypass to the second hydraulic working chamber of the length-adjusting apparatus
30 hydraulic medium feed line
31 drainage
32, 33 hydraulic line
35 crankshaft-side connecting rod bearing
40 prior art control device
140, 240, control device of an inventive connecting rod 340, 440, 540
41A, 41B valve body
42A, 42B valve body return spring
43A, 43B valve seat
44A, 44B link rod
45, 45A, 45B adjusting piston
47, 47A, 47B adjusting piston return spring
48, 48A, 48B control cylinder
49, 49A, 49B cylinder base
50 valve housing
60A, 60B throttle
70A, 70B check valve
80 switching valve
84A, 84B stop
85A, 85B stop
90 axially acting retaining element
91A, 91B valve sleeve
A longitudinal axis of connecting rod
D1, D2, D3 cap
H1 lifting axis of the valve body of the first valve
H2 lifting axis of the valve body of the second valve
L effective connecting rod length
L1 first structural length of the control device
L2 second structural length of the control device
L3 third structural length of the control device
L4 fourth structural length of the control device
ΔL maximum change in effective connecting rod length
KW crankshaft axis
S adjusting axis
S1 first adjusting axis
S2 second adjusting axis
SL1 first control line
SL2 second control line
V1 first control device valve
V2 second control device valve

What is claimed is:

1. A length-adjustable connecting rod for a reciprocating piston engine, comprising: a hydraulic length-adjusting apparatus for adjusting an effective connecting rod length of the connecting rod; a control device switchable between at least two switching states for controlling a lengthwise adjustment of the connecting rod; wherein the hydraulic length-adjusting apparatus comprises a hydraulic cylinder with a piston, a first hydraulic working chamber, and a second hydraulic working chamber; wherein the control device comprises a first valve and a second valve; wherein the first valve of the control device is in fluid communication with the first hydraulic working chamber of the hydraulic length-adjusting apparatus, and the second valve of the control device is in fluid communication with the second hydraulic working chamber of the hydraulic length-adjusting apparatus; wherein the first valve can be actuated by means of a first hydraulically actuatable adjusting piston configured to move axially along a first adjusting axis and the second valve can be actuated by means of a second hydraulically actuatable adjusting piston configured to move axially along a second adjusting axis; wherein the first adjusting axis of the first valve of the control device differs from the second adjusting axis of the second valve of the control device; wherein at least one of the first adjusting axis of the first valve of the control device and the second adjusting axis of the second valve of the control device run parallel to a crankshaft axis with respect to a functional installed state of the connecting rod in the reciprocating piston engine; and wherein in a first switching state of the control device, a hydraulic medium return flow from the first hydraulic working chamber of the hydraulic length-adjusting apparatus is blocked and the second working chamber of the hydraulic length-adjusting apparatus is drained.

2. The length-adjustable connecting rod according to claim 1, wherein the connecting rod further comprises a first connecting rod shaft section and a second connecting rod shaft section, wherein the first and second connecting rod shaft sections are displaceable relative to one another to adjust the effective connecting rod length.

3. The length-adjustable connecting rod according to claim 2, wherein the first and second connecting rod shaft sections are telescopically displaceable into one another to adjust the effective connecting rod length.

4. The length-adjustable connecting rod according to claim 1, wherein at least one of the first adjusting piston of the first valve and the second adjusting piston of the second valve is designed as a single-acting adjusting piston.

5. The length-adjustable connecting rod according to claim 1, wherein at least one of the first adjusting piston of the first valve and the second adjusting piston of the second valve is designed as a double-acting adjusting piston, wherein the connecting rod further comprises a switching valve configured to actuate the control device, via which the double-acting adjusting piston can be subjected to a hydraulic medium pressure differential.

6. The length-adjustable connecting rod according to claim 1, wherein at least one of the first valve of the control device and the second valve of the control device is a globe valve and comprises a valve body axially displaceable along a lifting axis, wherein the valve body can be pressed against a valve seat to block the hydraulic medium return flow from the associated hydraulic working chamber fluidly connected to the associated valve and can be lifted from the valve seat to drain the associated hydraulic working chamber.

7. The length-adjustable connecting rod according to claim 6, wherein the lifting axis of the globe valve runs parallel to crankshaft axis.

8. The length-adjustable connecting rod according to claim 6, wherein the first valve of the control device is a first globe valve and the second valve of the control device is a second globe valve, wherein in the first switching state of the control device, the valve body of the first valve bears on the valve seat and blocks the hydraulic medium return flow from the first hydraulic working chamber of the hydraulic length-adjusting apparatus and the valve body of the second valve is lifted from the valve seat and the second hydraulic working chamber of the hydraulic length-adjusting apparatus is drained, and wherein in the second switching state of the control device, the valve body of the first valve is lifted from the valve seat and the first hydraulic working chamber is drained and the valve body of the second valve bears on the valve seat and blocks the hydraulic medium return flow from the second hydraulic working chamber of the hydraulic length-adjusting apparatus.

9. The length-adjustable connecting rod according to claim 6, wherein the valve body of the globe valve is at least partly spherical, conical, or frustoconical in form in a contact area where the valve body can be pressed against the valve seat.

10. The length-adjustable connecting rod according to claim 6, wherein the valve body of the globe valve is a separate component from the adjusting piston of the associated valve.

11. The length-adjustable connecting rod according to claim 10, wherein the valve body of the globe valve is configured to lift off the valve seat against a valve body restoring force.

12. The length-adjustable connecting rod according to claim 10, wherein the connecting rod further comprises a hydraulic medium feed line, wherein the first hydraulic working chamber of the hydraulic length-adjusting apparatus is in fluid communication with the hydraulic medium feed line by the first valve of the control device designed as the globe valve and/or the second hydraulic working chamber of the hydraulic length-adjusting apparatus is in fluid communication with the hydraulic medium feed line by the second valve of the control device designed as the globe valve.

13. The length-adjustable connecting rod according to claim 6, wherein the valve body of the globe valve of the control device is fixedly connected to the adjusting piston of the associated valve.

14. The length-adjustable connecting rod according to claim 1, wherein the connecting rod further comprises a hydraulic medium feed line, wherein the hydraulic medium feed line is fluidly connected to at least one of the first hydraulic working chamber of the hydraulic length-adjusting apparatus and the second hydraulic working chamber of the hydraulic length-adjusting apparatus.

15. The length-adjustable connecting rod according to claim 1, wherein at least one of the first valve of the control device and the second valve of the control device is at least partly accommodated in the connecting rod a valve housing.

16. The length-adjustable connecting rod according to claim 1, wherein at least one of the first valve and the second valve of the control device is accommodated in the connecting rod a valve housing.

17. A reciprocating piston engine comprising at least one connecting rod, wherein the connecting rod is designed in accordance with claim 1.

18. A vehicle having a reciprocating piston internal combustion engine, wherein the reciprocating piston internal combustion engine is designed in accordance with claim 17.

* * * * *